United States Patent [19]

Overgaard

[11] Patent Number: 4,796,544
[45] Date of Patent: Jan. 10, 1989

[54] APPARATUS FOR TEARING UP AND STOKING BALES OF STRAW MATERIAL AND FOR STOKING OTHER KINDS OF SOLID FUEL

[75] Inventor: Arvid Overgaard, Industivej, Denmark

[73] Assignee: Norfab A/S, Mariager, Denmark

[21] Appl. No.: 918,999

[22] PCT Filed: Jan. 17, 1986

[86] PCT No.: PCT/DK86/00008
§ 371 Date: Sep. 17, 1986
§ 102(e) Date: Sep. 17, 1986

[87] PCT Pub. No.: WO86/04404
PCT Pub. Date: Jul. 31, 1986

[30] Foreign Application Priority Data

Jan. 17, 1985 [DK] Denmark .............................. 0206/85

[51] Int. Cl.⁴ ................................................ F23B 1/28
[52] U.S. Cl. ................................ 110/196; 120/101 C; 120/222; 120/289
[58] Field of Search ............... 110/196, 222, 197, 281, 110/282, 101 C, 289

[56] References Cited

U.S. PATENT DOCUMENTS

| | | | |
|---|---|---|---|
| 770,143 | 9/1904 | Woudmansee | 110/196 |
| 957,163 | 5/1910 | Johnson | 110/196 |
| 4,637,327 | 1/1987 | Jorgensen | 110/101 C |

FOREIGN PATENT DOCUMENTS

| | | | |
|---|---|---|---|
| 117297 | 11/1983 | European Pat. Off. | |
| 160982 | 9/1904 | Fed. Rep. of Germany | |
| 3117047 | 11/1982 | Fed. Rep. of Germany | 110/222 |
| 3302380 | 7/1984 | Fed. Rep. of Germany | 110/196 |
| 511360 | 9/1920 | France | |
| 40815 | 8/1913 | Sweden | |
| 2103668 | 6/1982 | United Kingdom | |

Primary Examiner—Edward G. Favors
Attorney, Agent, or Firm—Birch, Stewart, Kolasch & Birch

[57] ABSTRACT

An apparatus for comminuting and stoking of straw bales, and for automatic stoking of chips, pieces of wood, paper, industrial waste, garbage, lignite, coal, briquettes, pellets, and similar solid fuel includes a number of substantially parallel reciprocating or eccentrically moved serrated rods situated in connection with a feeding opening of a furnace. The serrated rods are operatively positioned for comminuting fuel and for tearing any retaining material utilized to contain the fuel. A feeder is provided for feeding fuel onto the serrated rods. A grate is situated between the serrated rods and a conveyor supplies fuel into the furnace.

18 Claims, 7 Drawing Sheets

APPARATUS FOR TEARING UP AND STOKING BALES OF STRAW MATERIAL AND FOR STOKING OTHER KINDS OF SOLID FUEL

BACKGROUND OF THE INVENTION

1. Field of the Invention

This invention relates to apparatus for tearing up and stoking of straw bales, and for automatic stoking of chips, pieces of wood, paper, industrial waste, garbage, lignite, coal, briquettes, pellets and other similar solid fuels.

2. Description of Background Art

For combustion of straw bales, especially large bales like round bales or rectilinear bales, the bales are torn up or cut to pieces in a so called bale cutter before the straw is fed into the furnace by a screw conveyor or a blower. Several different types of bale cutters are known. Their main shortcomings are that they are sensitive to the earth and stone particles that follow the bales, and to the string that the bales are held together by.

SUMMARY AND OBJECTS OF THE INVENTION

The objective of the invention is to provide a robust and reliable apparatus for tearing up and stoking straw bales, which is not sensitive to the earth and stone particles or the string which is found in the bales. It should also be possible to use the apparatus for combustion of other kinds of solid fuel than straw bales.

According to the invention this is achieved by an apparatus which comprises a number of parallel reciprocating or eccentrically moved serrated rods, which are situated in connection with the feeding opening of the furnace, so that the fuel, which is fed from a magazine onto the rods, is conveyed into the furnace. The serrated rods can tear up the string and straw from the bottom, and carry it away during the reciprocating or eccentric motion of the rods. Since the apparatus, in contrast to the known straw cutters, does not comprise any actual knives it is not sensitive to earth or stone particles or string. A suitable shape of the serrations is that the edge of the teeth is vertical on the forward side, while the rear side slopes downward towards the center of the rods. This is a practical method of comminuting the bales and transporting the material, and at the asme time it gives the least possible resistance in the back stroke. The serrated rods can be extended into the furnace, so that they also serve as the grate of the furnace. It is, however, preferred that the apparatus is made as a separate unit, independent of the furnace.

The fuel can be fed from the reciprocating or eccentrically moved serrated rods into the furnace by an intermediate sliding ramp or screw conveyor, but it is convenient that the rods are located in direct connection with the feeding opening of the furnace, so that the fuel is fed directly onto the grate of the furnace.

In a convenient arrangement the serrated rods are attached to a common yoke that is driven by a single propulsion unit. It is, however, obvious that the serrated rods can be moved individually, or in groups.

In order to achieve an even reciprocating or eccentrical movement of the serrated rods, the apparatus is preferably designed so that the reciprocating or eccentrical movement is imparted over a flywheel that is driven by a motor. The irregularities in the movement of the serrated rods which might occur as a consequence of uneven composition of the fuel is then compensated by the flywheel, and a smaller motor may be used.

In order to prevent the fuel from falling between the serrated rods, a grate can be positioned between them. The grate can be used for regulating the amount of fuel which is fed into the furnace, if it is arranged so that it can be raised or lowered in relation to the serrated rods. This is preferably done by hinging the grate in the end that is closest to the feeding door. When the grate is raised the protuding area of the teeth decreases, and as a consequence they transport less material. The grate can also be used for achieving a smooth action of the serrated rods. If the fuel should contain some specially resistant material, the grate is raised, so that only a small part of the teeth protrude.

The movement of the grate can be controlled in several ways. A suitable way is that the vertical movement of the grate is controlled in response to the load of the motor. At occasions when the load is high, that is when the fuel contains resistant material, the grate is raised accordingly. It is also suitable that the vertical movement of the grate is controlled in response to the load of the furnace. If the load is high, the grate is lowered, and the serrated rods convey a relatively large amount of fuel into the furnace. If, on the other hand, the load is small, the grate is raised, and only a small amount is transported.

In an apparatus in which the fuel is fed in separate charges, for example in the form of bales of straw or paper, the apparatus can be arranged so that a room with a door is situated above the rods. The door can be opened to a horizontal position for receiving the fuel, and dumps the fuel into the room when it is closed. At a level below the door is a horizontal movable fire damper, on which the fuel lies. The fire damper can be pulled out so that the fuel falls down onto the serrated rods. Thereby is a simple solution found to the fire-protection problems wich occur in the combustion of straw. The opening of the door and the fire damper can be controlled in response to the negative pressure in the room, which shows that no burning back has occurred in the material.

BRIEF DESCRIPTION OF THE DRAWINGS

Other details and advantages of the invention will be made clear in the following detailed description of a preferred embodiment of the invention, referring to the figures, of which

DETAILED DESCRIPTION OF THE PREFERRED EMBODIMENT

Figure 1:
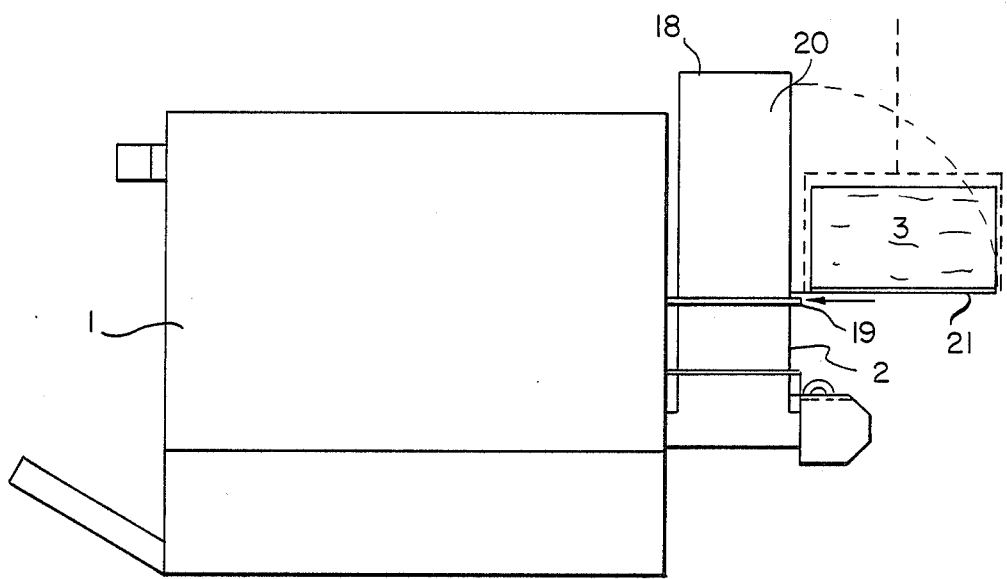
FIG. 1 shows, diagrammatically, a furnace and the apparatus according to the invention seen from the side.

In FIG. 1 an ordinary furnace 1 and an apparatus 2 for automatic comminuting and stoking of rectilinear large bales 3 are illustrated.

The apparatus comprises a number of reciprocating rods 4, which are equipped with serrations 5 on the top. The serrated rods 4 are connected to a common yoke 6 which is driven by an electric motor 7 over a flywheel 8 and a connection rod 9. The rods 4 are connected to the yoke 6 by short rods 10 which slide in bushings 11 that are attached to a supporting frame. The opposite end of the rods 4 are also connected to a number of short rods 12, which in a corresponding way slide through bushing 13 that are attached to the frame.

Between the serrated rods 4 is a grate 14. The grate 14 is hinged at 15 to the frame at the feeding opening 16. The opposite end of the grate is connected to a pneumatic or hydraulic cyliner 17 which can raise or lower the grate 14, so that larger or smaller parts of the teeth of the serrated rods 4 are exposed.

Above the serrated rods 4 a room 18 is situated. The upper part of the room 18, above a horizontal fire damper 19, is called the feeding shaft 20. The damper, which can be extracted in a horizontal direction, divides the room in two parts and prevents burning-back in the fuel.

The feeding shaft 20 is equipped with a shaft door 21, which can be swung down to a horizontal position in order to receive the fuel.

Figure 5:
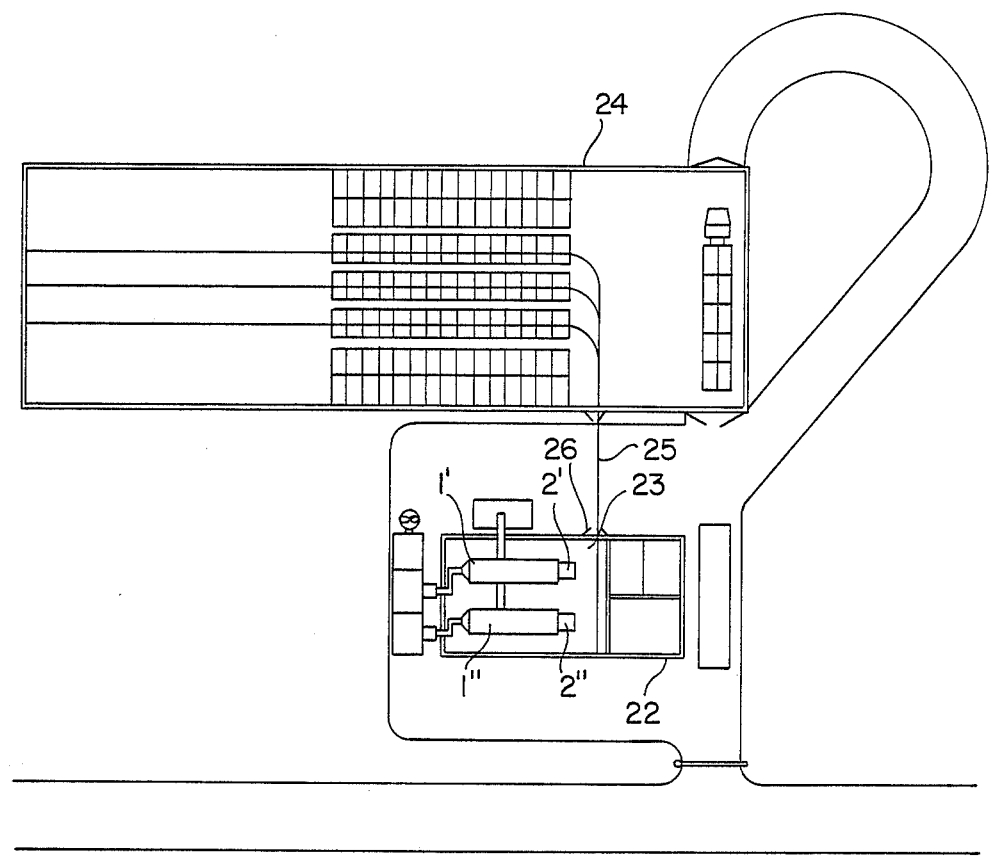
FIG. 5 shows a plan of a furnace plant designed in accordance with the invention.

In FIG. 5 a plan of a furnace plant is shown, which comprises a building 22 with two furnace 1',1", both of which are equipped with an apparatus as describe above. The room which contains the furnaces is called the sluice room 23. For fire-protection reasons the storage building 24 for the fuel is situated at a distance from the building 22. From the storage building 24 an automatic crane 25 conveys the fuel to the building 22. The sluice room 23 is furnished with a fire door 26. The other details which are shown in the figure are not significant for the understanding of the invention.

The different functions are controlled by an automatic control mechanism, which will not be described specifically and which can be made from standard components. A pressure transducer is used for detecting the pressure in the feeding shaft, and the automatic crane and the fire door are controlled by microswitches.

The function of the apparatus will be closer described in the following paragraphs.

At the feeding, the fire damper 19 closes and the negative pressure in the feeding chute 20 is ascertained. The fire door 26 opens and the automatically controlled crane 25 conveys a bale into the sluice room 23, whereupon the fire door 26 closes again. When the fire door 26 is reported closed and the crane 25 is reported inside the sluice room 23, the shaft dor 21 of the boiler which has "called" for the fuel opens, if there is still a negative pressure in the shaft 20 above the fire damper 19. When the shaft door 21 is reported open the automatic crane 25 places the bale on top of the shaft door 21, whereupon the automatic crane 25 returns to the position by the fire door 26. The shaft door 21 closes and the straw bale slides into the feeding shaft 20. Then the shaft door 21 is reported closed, the fire door 26 opens, if there is a negative pressure in the feeding shaft 20, and the automatic crane 25 travels out. When the automatic crane 25 is reported outside, the fire door closes again, and the automatic crane will thereafter work independently from the rest of the system.

When the shaft door 21 is reported closed, the fire damper 19 opens and the straw bale slides down on top of the preceding bale. The fire damper 19 starts to press against the bale, which causes the strings around the bale to break whereupon the damper 19 opens again.

The bottom of the shaft is covered by several rows of the serrated rods 4, the reciprocating movement of which causes the straw to be torn up and conveyed into the furnace as it is burned up. Between the serrated rods 4 lies the grate 14. The grate moves, as has been mentioned earlier, up and down according to the current consumption of the motor 7 and the fuel consumption, which depends on the load of the furnace.

When the latest fed straw bale is lowered under the firedamper 19 it is closed, and the described feeding process starts again.

Figure 6:
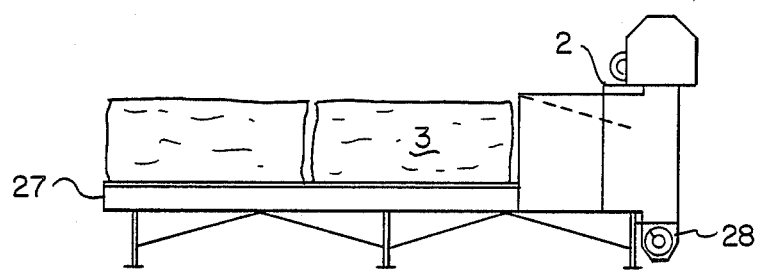
FIG. 6 shows, diagrammatically, embodiment of the apparatus in connection with a straw conveyor.
Figure 2:
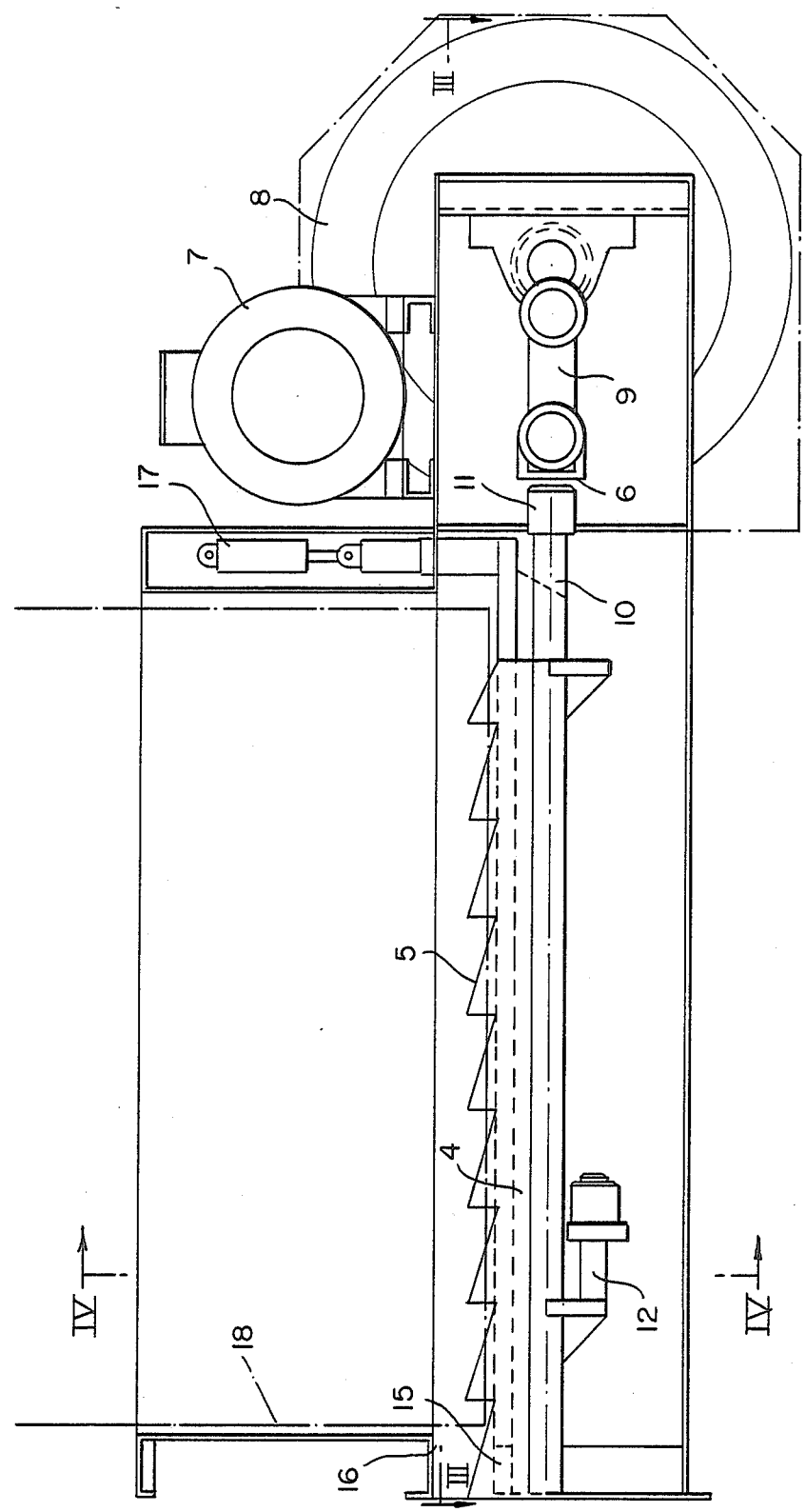
FIG. 2 shows a section through the bottom part of the apparatus.
Figure 3:
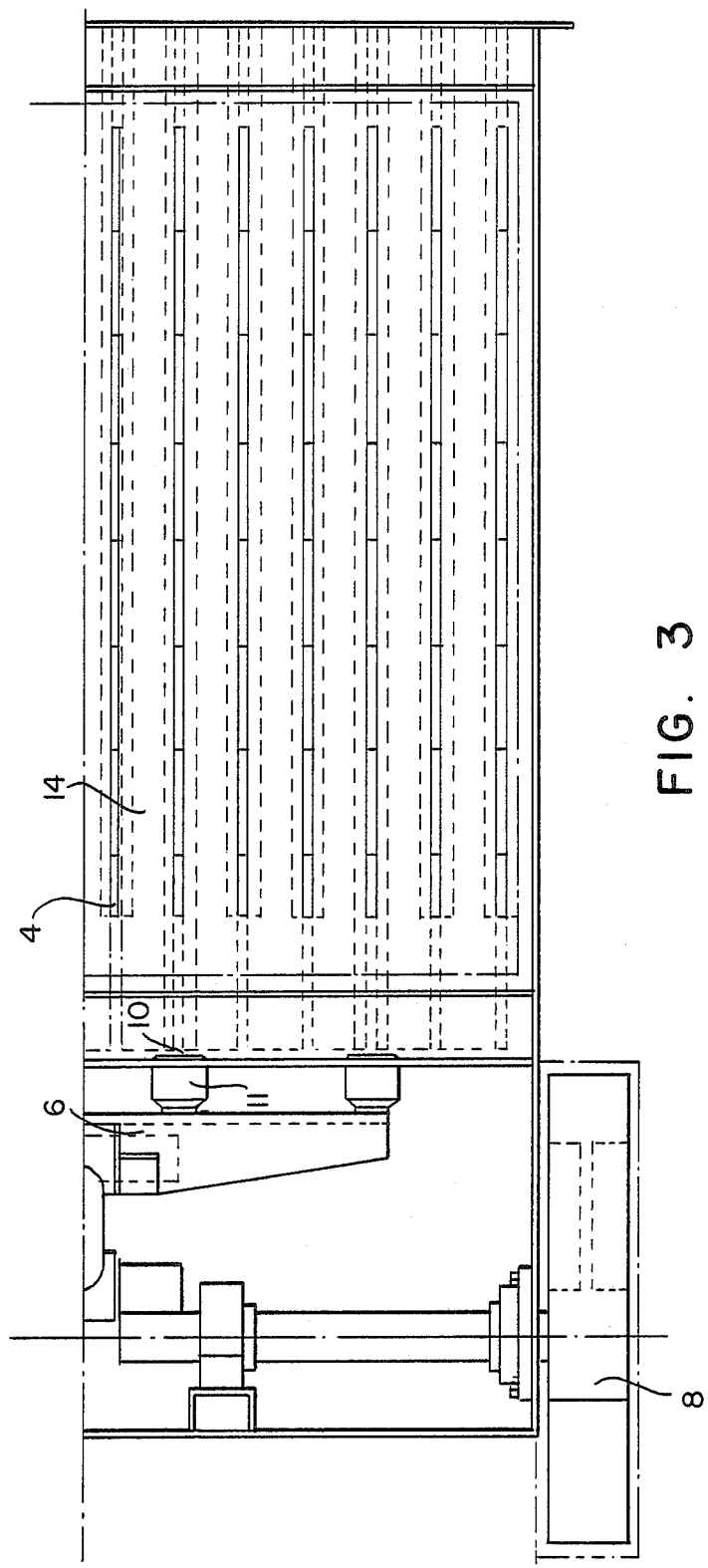
FIG. 3 shows a section through one half of the apparatus along the line III—III in FIG. 2, seen from above.
Figure 4:
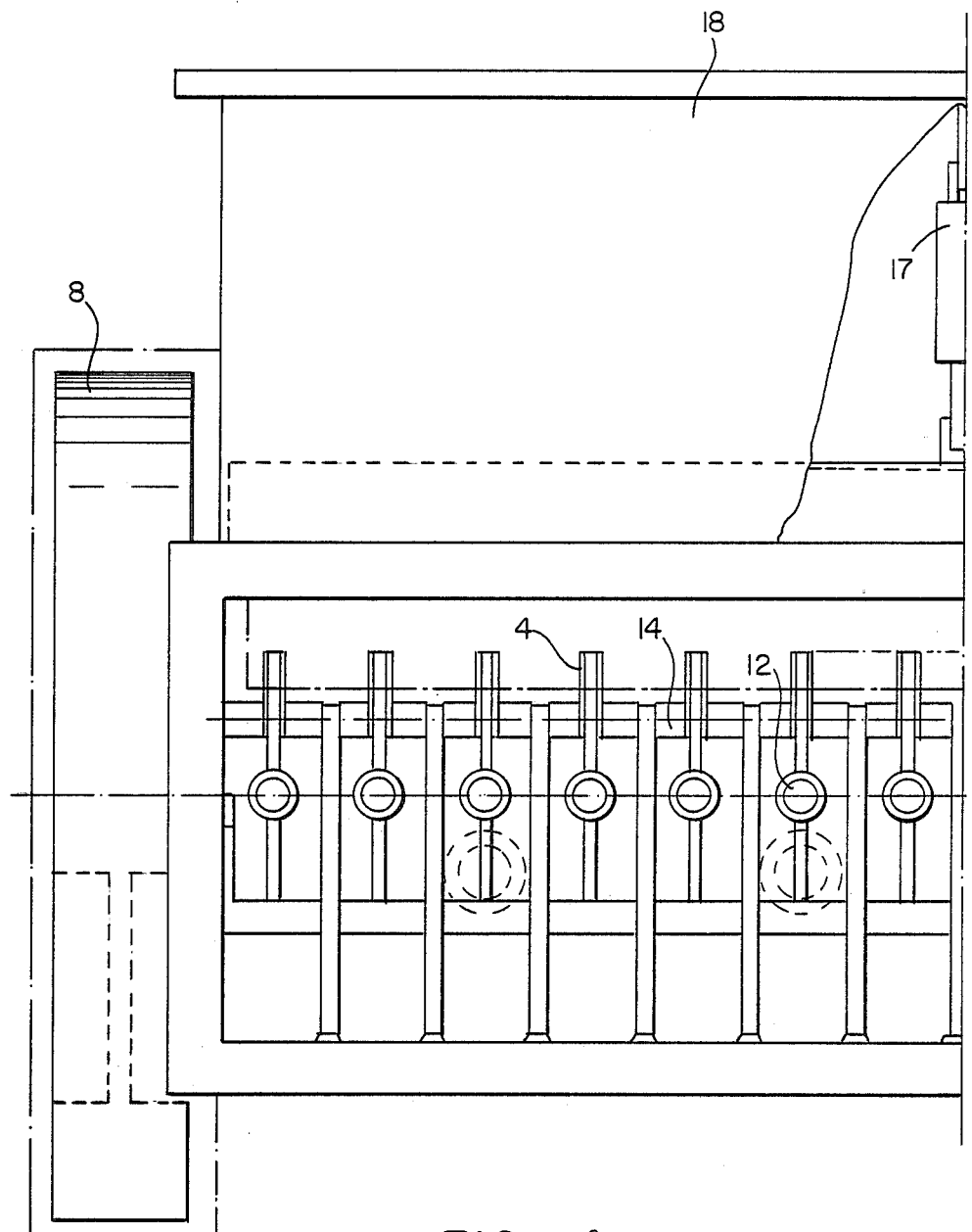
FIG. 4 shows a section through one half of the apparatus along the line IV—IV in FIG. 2.

FIG. 6 shows an embodiment in which the apparatus 1 according to the invention is connected to a straw conveyor 27. Here the apparatus is mounted vertically, and conveys the straw down to a screw 28 which transports it into the furnace.

As mentioned earlier, the described apparatus has the advantage that it can be used with different forms of solid fuel, separately or mixed. If no straw is available, one can without difficulties switch to another fuel, for example wood chips.

Figure 7:
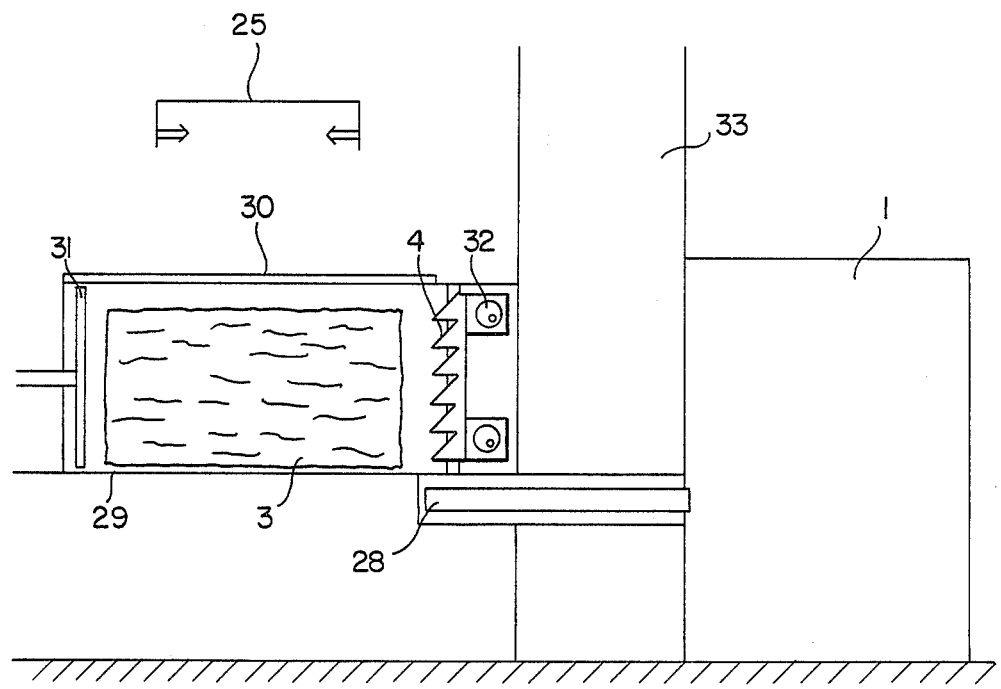
FIG. 7 shows, diagrammatically, a section through an embodiment of the apparatus with vertical eccentrically moved rods.
Figure 8:
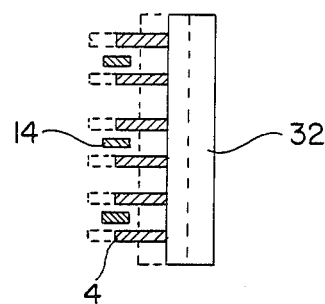
FIG. 8 shows, diagrammatically, the rods seen from above, in solid lines when teeth are raised, and in broken lines when the teeth are lowered.
Figure 9:
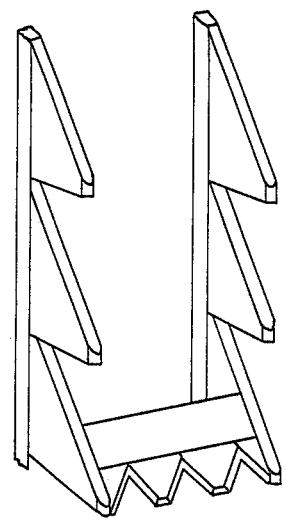
FIG. 9 shows, diagrammatically, the knives for cutting the strings of the bales.

Yet another embodiment is shown in FIG. 7. The apparatus for automatic comminuting and stoking of straw bales comprises a box 29 with an openable door 30, through which the straw bale 3 is lowered by the crane 25. One of the sides of the box 29 consists of a hydraulic ram 31, which pushes the straw bale 3 against the comminuting apparatus which is attached to the other side of the box. The comminuting apparatus comprises a number of vertical serrated rods 4, which in both ends are eccentrically connected to an axle, so that the rods move eccentrically. All of the rods are moved at the same time, so that the straw is "raked" from the bale and carried downwards. The eccentric motion should be larger than the distance between two adjacent teeth, so that the straw moves downward from tooth to tooth and is released from the teeth by the immobile rods 14. The serrated rods are arranged two by two with an immobile rod 14 disposed therebetween at a short distance.

From the comminuting apparatus the straw is carried down into a screw conveyor 28, which conveys the straw into the furnace. The furnace is separated from the comminuting apparatus by a fire wall 33.

The pressing force of a the hydraulic ram 31 is controlled by the current consumption of the comminuting apparatus, so that the bale is always pushed against the serrated rods with a suitable force. The pressure is automatically released if the comminutor is too heavily loaded.

In order to cut off the strings which hold the bales together, the serrated rods can be equipped with a set of knives 34, which are attached to the slanted edge of the teeth of the rods.

I claim:
1. An apparatus for comminuting and stoking of straw bales, and for automatic stoking of chips, pieces of wood, paper, industrial waste, garbage, lignite, coal briquettes, pellets, and similar solid fuel comprising:

a number of substantially parallel reciprocating or eccentrically moved serrated rods situated in connection with a feeding opening of a furnace, said serrated rods being operatively positioned for comminuting fuel and for tearing any retaining material utilized to contain the fuel;

means for feeding fuel onto the serrated rods;

a grate situated between the serrated rods, said grate being vertically movable in relation to the serrated rods, preferably by being hinged in the end that is closest to the feeding opening; and means for conveying fuel into the furnace.

2. The apparatus of claim 1, wherein the serrated rods are situated in direct connection with the feeding opening of the furnace, and that the fuel is fed directly onto the grate of the furnace.

3. The apparatus of claim 1, wherein the serrated rods are connected to a common yoke.

4. The apparatus of claim 1, wherein the serrated rod are set in a reciprocating or eccentric motion over a flywheel that is driven by a motor.

5. The apparatus of claim 4, wherein the vertical movement of the grate is controlled in response to the load of the motor.

6. The apparatus of claim 5, wherein the vertical movement of the grate is controlled also in response to the load of the furnace.

7. The apparatus of claim 1, wherein the fuel is fed to the serrated rods in separate charges in the form of bales of straw or paper, characterized in that above the serrated rods a room is situated, an openable door operatively connected to said room for opening to a horizontal position for receiving the fuel and dumping the fuel into the room when it is closed; a horizontally movable fire damper operatively positioned at a level below the door, said fire damper can be pulled out so that fuel positioned thereon falls down onto the serrated rods.

8. The apparatus of claim 5, wherein the opening of the door and the fire damper is controlled in response to a negative pressure in the room.

9. The apparatus of claim 2, wherein the serrated rods are set in a reciprocating or excentric motion over a flywheel that is driven by a motor.

10. The apparatus of claim 1, wherein the vertical movement of the grate is controlled in response to the load of the motor.

11. An apparatus for comminuting and stoking of straw bales, and for automatic stoking of chips, pieces of wood, paper, industrial waste, garbage, lignite, coal briquettes, pellets, and similar solid fuel comprising:

a box for receiving fuel;

a door operatively positioned relative to said box for opening and closing, said door permits fuel to be supplied to said box when said door is in an open position;

a plurality of substantially parallel reciprocating or eccentrically moved serrated rods positioned adjacent to said box and adjacent to a feeding opening of a furnace, said serrated rods being operatively positioned for comminuting fuel and for tearing any retaining material utilized to contain the fuel;

a grate situated between the serrated rods;

advancing means for advancing fuel into engagement with said serrated rods, wherein said advancing means is a hydraulic ram; and conveyor means for supplying fuel into a furnace.

12. An apparatus according to claim 11, wherein said conveyor means is a screw conveyor.

13. An apparatus according to claim 11, wherein the serrated rods are situated in direct connection with the feeding opening of the furnace, and that the fuel is fed directly onto the grate of the furnace.

14. An apparatus according to claim 11, wherein the serrated rods are connected to a common yoke.

15. An apparatus according to claim 11, wherein the serrated rods are set in a reciprocating or eccentric motion over a flywheel that is driven by a motor.

16. An apparatus according to claim 11, wherein the grate is vertically movable in relation to the serrated rods, preferably by being hinged in the end that is closest to the feeding opening.

17. An apparatus according to claim 15, wherein the vertical movement of the grate is controlled in response to the load of the motor.

18. An apparatus according to claim 17, wherein the vertical movement of the gate is controlled also in response to the load of the furnace.

* * * * *